United States Patent
Bakas et al.

(10) Patent No.: US 8,643,323 B2
(45) Date of Patent: *Feb. 4, 2014

(54) PHOTOVOLTAIC SYSTEM

(75) Inventors: Panagiotis Bakas, Västerås (SE);
Georgios Demetriades, Västerås (SE);
Frans Dijkhuizen, Skultuna (SE);
Staffan Norrga, Stockholm (SE);
Konstantinos Papastergiou, Västerås (SE); Bengt Stridh, Västerås (SE);
Stefan Thorburn, Västerås (SE);
Lennart Ängquist, Enköplng (SE)

(73) Assignee: ABB Research Ltd, Zurich (CH)

( * ) Notice: Subject to any disclaimer, the term of this patent is extended or adjusted under 35 U.S.C. 154(b) by 24 days.

This patent is subject to a terminal disclaimer.

(21) Appl. No.: 13/163,173

(22) Filed: Jun. 17, 2011

(65) Prior Publication Data

US 2012/0025751 A1 Feb. 2, 2012

Related U.S. Application Data

(63) Continuation of application No. PCT/EP2009/067565, filed on Dec. 18, 2009.

(30) Foreign Application Priority Data

Dec. 19, 2008 (EP) .................................. 08172418

(51) Int. Cl.
*H02J 7/35* (2006.01)
(52) U.S. Cl.
USPC ........... 320/101; 320/138; 320/139; 323/906; 136/291

(58) Field of Classification Search
USPC ......................................................... 320/101
See application file for complete search history.

(56) References Cited

U.S. PATENT DOCUMENTS

| 4,134,057 | A | | 1/1979 | Portmann |
| 4,165,477 | A | * | 8/1979 | Comte .......................... 320/101 |

(Continued)

FOREIGN PATENT DOCUMENTS

| DE | 2646715 A1 | 11/1977 |
| DE | 4204237 A1 | 8/1993 |

(Continued)

OTHER PUBLICATIONS

International Search Report (PCT/ISA/210) issued on Jul. 28, 2010, by European Patent Office as the International Searching Authority for International Application No. PCT/EP2009/067565.

(Continued)

*Primary Examiner* — Yalkew Fantu
(74) *Attorney, Agent, or Firm* — Buchanan Ingersoll & Rooney PC

(57) ABSTRACT

A photovoltaic system for generating an output voltage that is uninfluenced by varying irradiation, includes a photovoltaic source having an input terminal and an output terminal. The photovoltaic system includes a voltage adding arrangement having a first input terminal and an output terminal. The voltage adding arrangement is connected in series with the photovoltaic source, and includes a first route having a voltage source and a second route as a voltage source bypass. The first and second routes extend between the first input terminal and the output terminal of the voltage adding arrangement. The first and second routes being alternately activateable.

13 Claims, 5 Drawing Sheets

(56) References Cited

U.S. PATENT DOCUMENTS

| | | | |
|---|---|---|---|
| 5,327,071 A | | 7/1994 | Frederick et al. |
| 5,929,538 A | * | 7/1999 | O'Sullivan et al. ............. 307/66 |
| 6,034,506 A | * | 3/2000 | Hall .............................. 320/117 |
| 6,262,558 B1 | * | 7/2001 | Weinberg ....................... 320/101 |
| 2002/0146617 A1 | * | 10/2002 | Johnson et al. ................. 429/50 |
| 2003/0230334 A1 | | 12/2003 | Chang et al. |
| 2006/0231132 A1 | | 10/2006 | Neussner |
| 2008/0099062 A1 | | 5/2008 | Armstrong et al. |
| 2008/0211451 A1 | | 9/2008 | Zhang et al. |
| 2008/0309283 A1 | | 12/2008 | Neeb et al. |

FOREIGN PATENT DOCUMENTS

| | | |
|---|---|---|
| EP | 1901414 A1 | 3/2008 |
| FR | 2335081 | 7/1977 |
| WO | WO 2006/041296 A2 | 4/2006 |

OTHER PUBLICATIONS

European Search Report issued Jul. 21, 2009 for European Application No. 08172418.

International Search Report (PCT/ISA/210) issued on Aug. 11, 2010, by European Patent Office as the International Searching Authority for International Application No. PCT/EP2009/067568.

European Search Report issued May 26, 2009 for European Application No. 08172417.

Notice of Allowance issued Sep. 17, 2013 in related U.S. Appl. No. 13/163,405.

\* cited by examiner

PHOTOVOLTAIC SYSTEM

RELATED APPLICATION

This application claims priority as a continuation application under 35 U.S.C. §120 to PCT/EP2009/067565, which was filed as an International Application on Dec. 18, 2009 designating the U.S., and which claims priority to European Application 08172418.9 filed in Europe on Dec. 19, 2008. The entire contents of these applications are hereby incorporated by reference in their entireties.

FIELD

The present disclosure relates large solar parks such as photovoltaic systems arranged to generate an output voltage that is uninfluenced by variable irradiation/weather, i.e. clouds shading the photovoltaic source.

BACKGROUND INFORMATION

The use of photovoltaic systems to generate power is increasingly establishing itself around the globe. Photovoltaic systems, also known as solar panel systems, can be easy to install, inexpensive to operate and can be used practically anywhere where sunlight is available. The various possibilities range from small fixed systems for home use right through to large solar parks with mobile solar modules that follow the position of the sun.

A photovoltaic source, such as a photovoltaic module including several photovoltaic cells, or a plurality of photovoltaic modules, should have optimal operation unaffected by irradiation from the sun, and the output voltage should be dependent directly on the degree of the instantaneous irradiation. Thus, when a cloud is shading the photovoltaic source the output voltage of the photovoltaic system can decrease. The direct correlation between the instantaneous irradiation and the output voltage can be a major issue in locations having a varying degree of irradiation.

The power mains, to which a photovoltaic source is arranged to feed electricity, specifies alternating current at a predetermined voltage level. In order to meet these specifications a DC/AC converter can be arranged between the photovoltaic source and the power mains, which converter can be arranged to operate at as wide an input voltage range as possible in order to manage a varying output voltage from the photovoltaic source. A converter managing a wide input voltage range can be proportionately expensive as it usually is comprised of more than one stage. A conventional way of managing a greatly varying input voltage is to use a boost DC/DC converter to provide a reasonable input voltage to said DC/AC converter. The use of a boost DC/DC converter at this stage can reduce the efficiency of the photovoltaic system.

DE 2646715 describes two generators, where a first is a photoelectric cell and the second can be a thermo-electric element. In one example, the two generators are connected in parallel with each other for loading a battery used for powering a load like a watch. One of the generators is disconnected from the other if it is not delivering enough power. This means that if one generator cannot deliver enough power, it gets disconnected or bypassed. If the remaining generator cannot deliver enough power, then the two generators are connected in series with each other. Finally, both generators are disconnected if the power from the two generators when connected in series is not enough.

FR 2335081 describes a device for enabling an accumulator to be recharged from a source of electrical energy, such as photo-cells. The device includes a converter circuit and a diode. The converter circuit can adapt the current and voltage supplied by said source to the charging conditions of the accumulator. The converter circuit is arranged to be saturated from a certain value of the current delivered by the source, the stronger currents passing directly through the diode.

WO 2006/041296 describes an apparatus for charging a battery, where a series connection of photovoltaic cells with a second battery is made in order to charge a first battery.

US 2002/146617 describes a solar cell that supplies power to a load. There is also a battery which supplies power to the load instead of the solar cell, when this is unable to. The battery includes a number of battery packs that can be selectively bypassed for reconditioning while the other remain on-line.

US 2003/230334 describes a cell that charges a battery via a converter. The battery also supplies power to a load via the converter.

EP 1901414 describes a solar cell used to load a battery for supplying power to a load in the form of a lamp. A converter is connected between solar cell and battery when loading.

SUMMARY

An exemplary embodiment of the present disclosure is directed to a photovoltaic system for generating an output voltage that is uninfluenced by varying irradiation. The photovoltaic system comprises an electrically rechargeable photovoltaic source having a first connector and a second connector, and a voltage adding arrangement that includes a first connector and a second connector, a first route having a voltage source, and a second route as a voltage source bypass, wherein the first and second routes extend between said first connector and said second connector of the voltage adding arrangement. The voltage adding arrangement is connected in series with the photovoltaic source and said first and second routes are alternately activateable. The voltage adding arrangement includes a charger device connected to the voltage source of the first route, the charger device having a first input terminal and a second input terminal, and is connected to a charger switch for using output voltage from the photovoltaic source to electrically charge the voltage source.

BRIEF DESCRIPTION OF THE DRAWINGS

A more complete understanding and other features and advantages of the present disclosure will be apparent from the following detailed description of exemplary embodiments in conjunction with the appended drawings, wherein.

DETAILED DESCRIPTION

Figure 1:
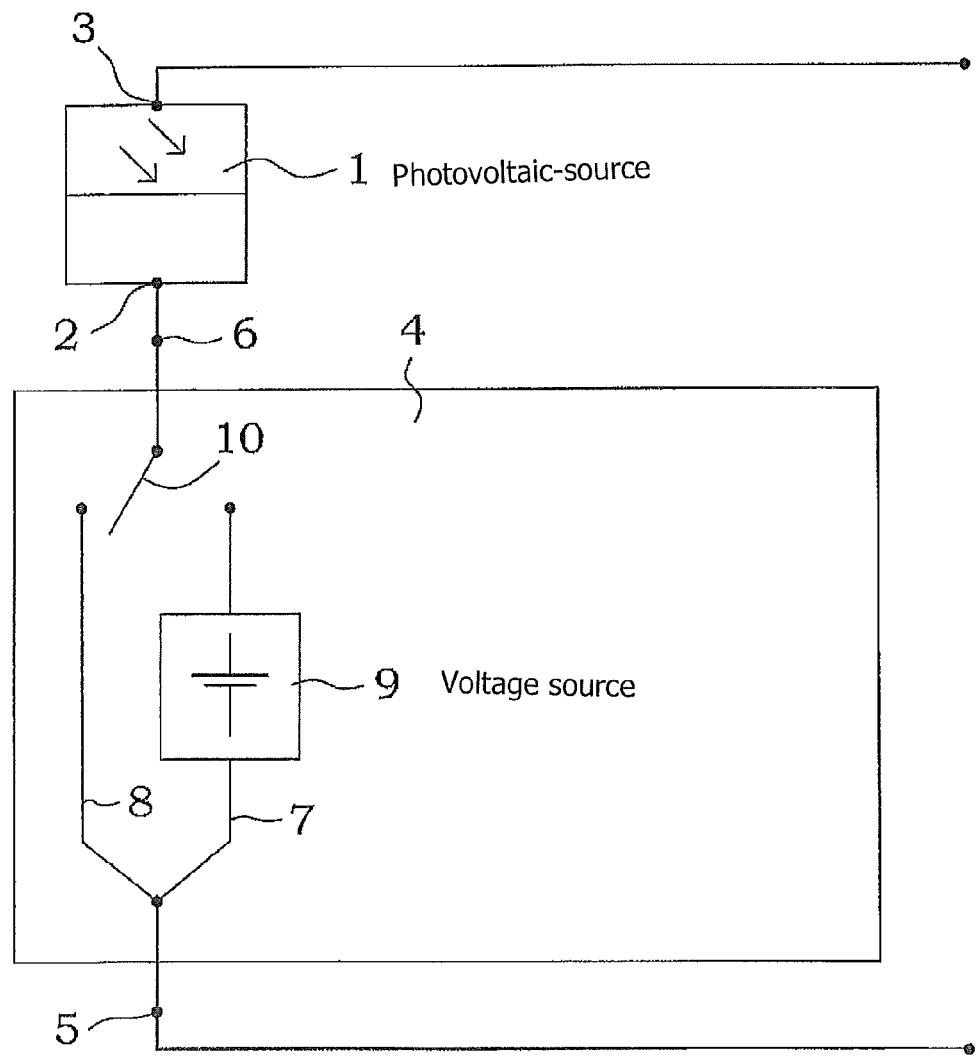
FIG. 1 is a schematic illustration of a first embodiment of a photovoltaic system in accordance with an exemplary embodiment.

The exemplary embodiments of the present disclosure are directed to obviating the aforementioned disadvantages of previously known photovoltaic systems, and at providing an improved photovoltaic system. A primary object of the exemplary embodiments of the present disclosure is to provide an improved photovoltaic system of the initially defined type which is arranged to generate an output voltage which is essentially uninfluenced by varying irradiation, i.e. a cloud shading the photovoltaic source, or if a specific photovoltaic source is malfunctioning.

It is another object of the exemplary embodiments of the present disclosure to provide a photovoltaic system, which adds voltage to the output voltage of the photovoltaic source when the latter is below a predetermined threshold value. The exemplary embodiments of the present disclosure also provide a photovoltaic system, which may store any surplus of the output voltage in order to be self supporting with regards to the occasional need of added voltage. The exemplary embodiments of the present disclosure provide a photovoltaic system capable of delivering an output power day and night. The exemplary embodiments of the present disclosure also provide a photovoltaic system, which is arranged to generate an output voltage which is essentially uninfluenced by varying irradiation.

According to an exemplary embodiment of the present disclosure, a photovoltaic system includes a voltage adding arrangement including a first connector (first input terminal) and a second connector (output terminal), as well as a first route including a voltage source and a second route serving as a voltage source bypass that extend between said first connector and said second connector of the voltage adding arrangement. The voltage adding arrangement is connected in series with the photovoltaic source and said first and second routes are alternately activatable. This voltage adding arrangement can further include a charger device connected to the voltage source of the first route, the charger device having a first input terminal and a second input terminal and being connected to a charger switch.

Thus, exemplary embodiments of the present disclosure are based on the insight that a voltage source connected in series with the photovoltaic source adds voltage when occasionally needed in order to get a less variable output voltage from the photovoltaic system, even at a location having a variable degree of instantaneous irradiation, or may be used in order to get an output power which corresponds to the instantaneous need.

The voltage source can be a fixed voltage source or a regulated voltage source, and in an exemplary embodiment of the present disclosure, the voltage source can include at least two batteries, which are individually connectable in series with the first route and with each other. Through this arrangement the added voltage from the voltage source can be added in a stepwise manner in order to get as invariable an output voltage of the photovoltaic system as possible.

To this end, in an exemplary embodiment the charger device, such as a DC/DC converter, can include a first input terminal that is connected, directly or indirectly, to a first connector (input terminal) of the photovoltaic source and the second input terminal that is connected, directly or indirectly, to a second connector (output terminal) of the photovoltaic source. Thereby, the charger uses the output voltage from the photovoltaic source to charge the voltage source, and thereby the photovoltaic system is self supporting with regards to the occasional need of added voltage.

According to another exemplary embodiment, the regulated voltage source of the voltage adding arrangement can include a bidirectional DC/DC converter and a voltage source, which is connected to a first input terminal and a second input terminal of the bidirectional DC/DC converter. A first output terminal of the bidirectional DC/DC converter can be connected to the first connector of the voltage adding arrangement and a second output terminal of the bidirectional DC/DC converter can be connected to the first route at the opposite side of the route switch than the second connector of the voltage adding arrangement and be connected by means of a charger switch, direct or indirect, to the second connector of the photovoltaic source. Thereby, the quantity of added voltage to the photovoltaic system is regulatable, which can result in the quantity of the added voltage ranging from 0% to 100% of the maximum voltage level of the voltage source, or even higher than 100% if the regulator is of a suitable boost converter type.

FIG. 1 is a schematic illustration of a first embodiment of an exemplary embodiment. The description referred to FIG. 1 can also be representative for all other embodiments within the scope of the conceptual idea of the present disclosure.

A photovoltaic system, also known as a solar panel system, includes a photovoltaic source 1. The smallest structural part of a photovoltaic source 1 can be a photovoltaic cell including (e.g. consisting of) a light absorbing material which is connected to an external circuit. A number of photovoltaic cells, connected in series constitute a photovoltaic module. The photovoltaic module can be used singly or a plurality of them can be connected in series, in parallel, or in any other combination as desired, to establish photovoltaic panels. Thus, a photovoltaic source 1 having a first connector 2 and a second connector 3 can include a photovoltaic module or a plurality of photovoltaic modules. The first connector of the photovoltaic source 1 will in the following be termed input terminal, while the second connector of the photovoltaic source 1 will be termed output terminal.

The photovoltaic source 1 can generate an output power at a certain current and a voltage under standard illumination/irradiation present at the location at which the specific photovoltaic system will operate. However, the photovoltaic source 1 can be directly dependent on the instantaneous irradiation from the sun, which occasionally can be more or less blocked by clouds which can result in the output voltage of the photovoltaic system varying over time. In order to overcome this problem, an exemplary embodiment of the present disclosure includes at least one voltage adding arrangement 4, that can be connected in series with said photovoltaic source 1. The voltage adding arrangement 4 can include a first connector 5 and a second connector 6, which can be connected to the input terminal 2 of the photovoltaic source 1.

In an exemplary embodiment of the present disclosure a voltage adding arrangement can also include a third and a fourth connector. The first connector of a voltage adding arrangement will in the following be termed first input terminal, while the second connector of a voltage adding arrangement will be termed output terminal. The third and fourth connectors will be termed second input terminal and third input terminal, respectively. As shown in FIG. 1, the photovoltaic source 1 is located downstream of the voltage adding arrangement 4. However, the mutual position of the photovoltaic source 1 and the voltage adding arrangement 4 when connected in series is insignificant and the voltage adding arrangement 4 can be located downstream the photovoltaic source 1. The photovoltaic system can be connected to a grid, power mains, or suitable power supply as desired, directly or indirectly, in order to supply the output power of the photovoltaic system to a user.

The voltage adding arrangement 4 includes a first route 7 and a second route 8 extending between the first input terminal 5 and the output terminal 6 of the voltage adding arrangement 4. The first route 7 can include a voltage source, 9, and the second route 8 can serve as a voltage source bypass, the first route 7 and the second route 8 can be alternately activatable. In an exemplary embodiment, the voltage adding arrangement 4 can include a common route switch 10 for the first route 7 and the second route 8. However, the first route 7 and the second route 8 can include separate route switches (not shown). It should be apparent that only one of the first route 7 and the second route 8 shall be active at the same time, in order not to short circuit the voltage source 9. Both the first route 7 and the second route 8 can be inactive at the same time.

When the second route 8 is active the photovoltaic system is in a first mode of operation, in which the output voltage of the photovoltaic system is equal to the output voltage of the photovoltaic source 1, some structural losses can occur. When the first route 7 is active the photovoltaic system is in a second mode of operation, in which the output voltage of the photovoltaic system is equal to the sum of the output voltage of the photovoltaic source 1 and the output voltage of the voltage adding arrangement 4, some structural losses can occur. The photovoltaic system switches preferably from the first mode of operation to the second mode of operation when the output voltage of the photovoltaic source 1 decreases below a predetermined threshold value, and vice versa. The instantaneous need of output voltage from the photovoltaic system can be considered to raise or lower said threshold values.

The voltage source 9 can be a fixed voltage source, e.g. a battery, a plurality of batteries, a fuel cell, or the like, or a regulated voltage source, e.g. a set of batteries, or an arrangement including a regulator, a fixed voltage, source, or other suitable voltage source as desired.

Figure 2:
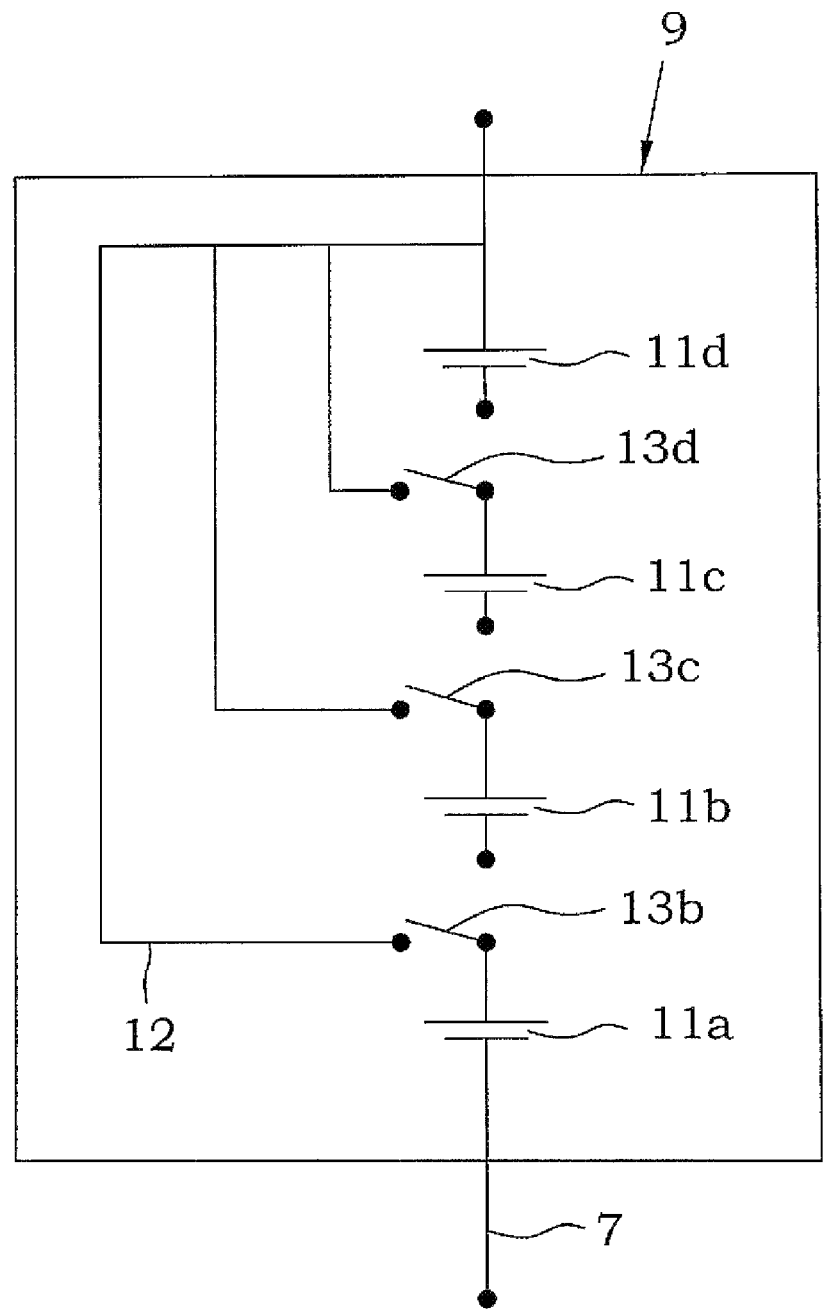
FIG. 2 is a schematic illustration of a regulated voltage source in accordance with an exemplary embodiment.

FIG. 2 is a schematic illustration of a regulated voltage source in accordance with an exemplary embodiment. The regulated voltage source 9 can include four batteries 11a, 11b, 11c, 11d, a bypass arrangement 12 of the first route 7 and three switches 13b, 13c, 13d. The default position of each switch 13b, 13c, 13d is in a disconnected position with regard to the corresponding battery 11b, 11c, 11d. The switch (e.g. the lowest switch) is in the disconnected position also and can be connected to the bypass arrangement 12. However, all switches 13b, 13c, 13d, can be connected to the bypass arrangement 12 when in the disconnected positions. By connecting the switches 13b, 13c, 13d to the corresponding batteries 11b, 11c, 11d, from below and upwards, a stepwise increase of the output voltage from the regulated voltage source 9 is made, depending on the instantaneous need of added voltage to the output voltage of the photovoltaic system. Thus, the batteries 11a, 11b, 11c, 11d are individually connectable in series with the first route 7 and with each other, and other structural combinations are thus conceivable.

Figure 3:
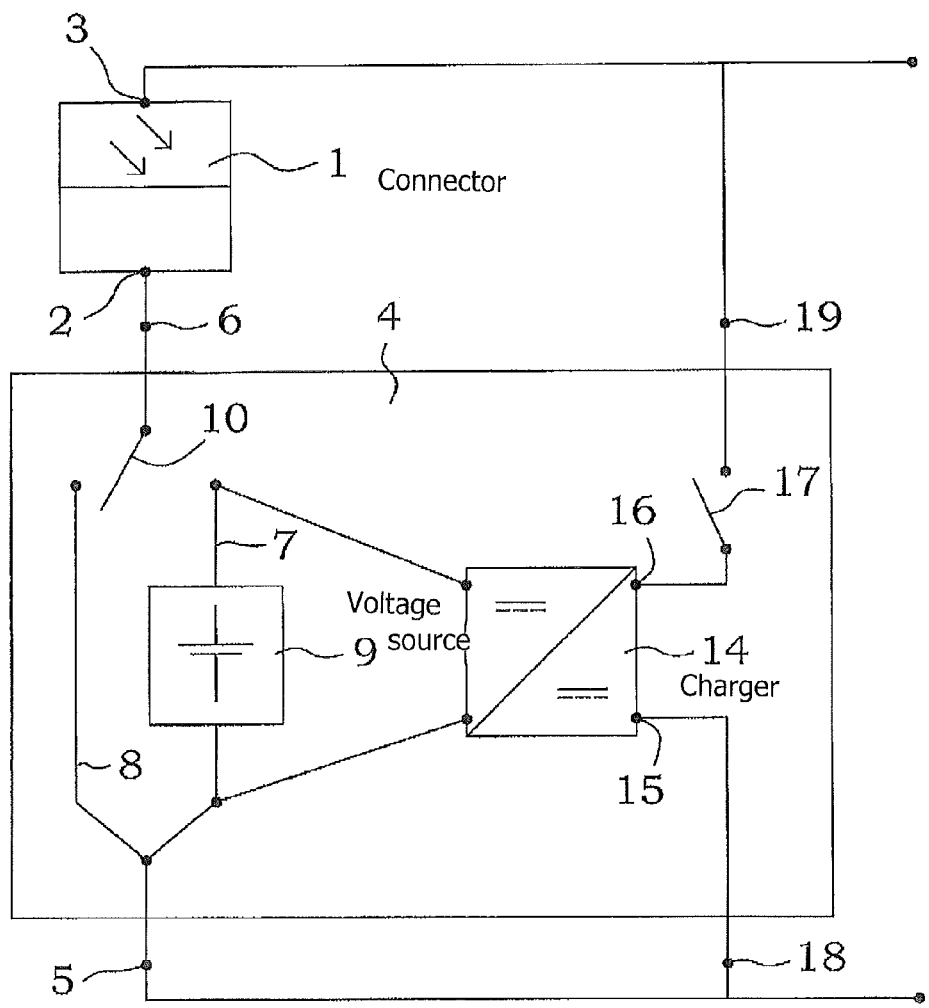
FIG. 3 is a schematic illustration of a second embodiment of the inventive photovoltaic system in accordance with an exemplary embodiment.
Figure 4:
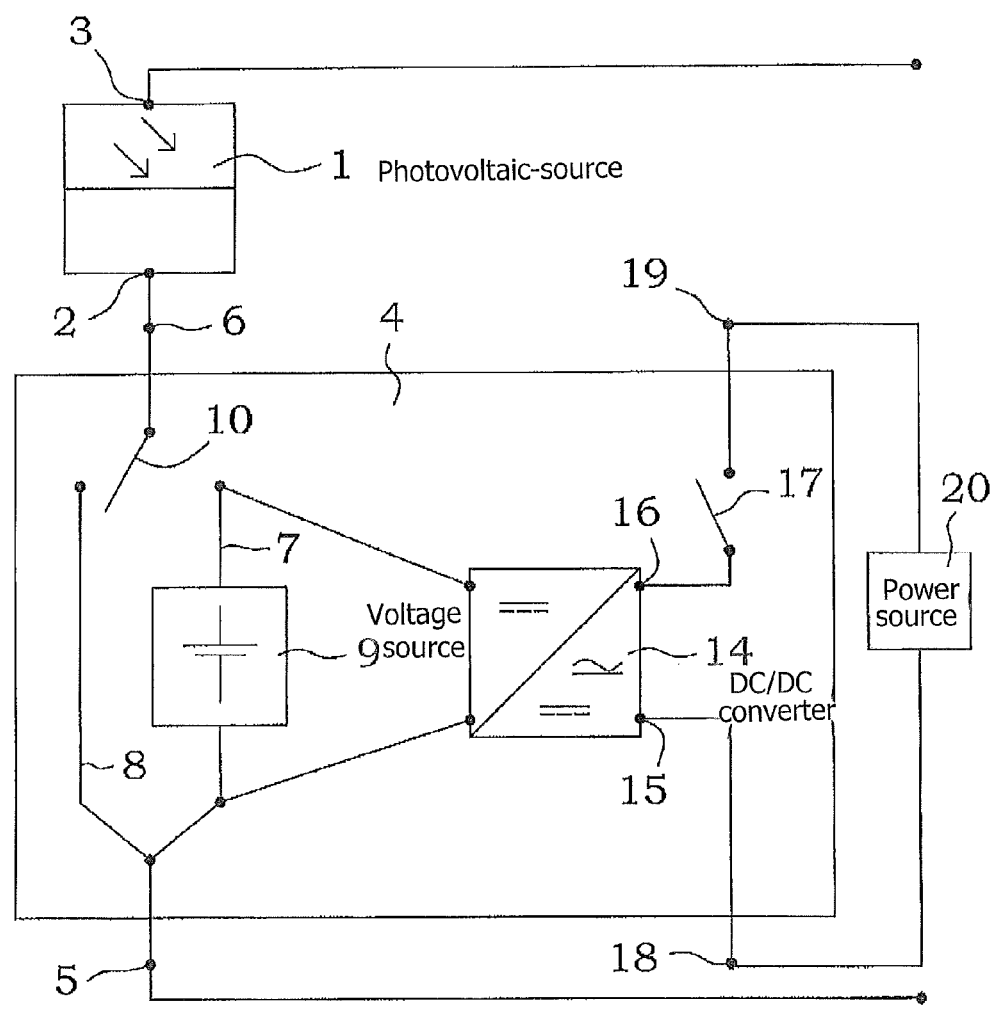
FIG. 4 is a schematic illustration of a third embodiment of the inventive photovoltaic system in accordance with an exemplary embodiment.

FIG. 3 is a schematic illustration of a second embodiment of the inventive photovoltaic system in accordance with an exemplary embodiment. FIG. 4 is a schematic illustration of a third embodiment of the inventive photovoltaic system in accordance with an exemplary embodiment.

The voltage adding arrangement 4 can include a charger device 14 connected to the voltage source 9 of the first route 7. The charger device 14 can include a first input terminal 15 and a second input terminal 16, at least one of which is connected to a charger switch 17. The charger device 14 has an inactive mode when the first route 7 of the voltage adding arrangement 4 is active and the charger switch 17 is open, and a charging mode when the second route 8 of the voltage adding arrangement 4 is active and the charger switch 17 is closed. The use of a charging device 14 implies that the voltage source 9 is rechargeable. The voltage source 9 can only be charged when there is no voltage output therefrom. However, if the voltage source 9 includes a set of batteries the, unused batteries can be charged even if there is a voltage output from the voltage source 9. Thus, when the photovoltaic system is in the first mode of operation the charging device 14 can be in either the inactive mode or the charging mode, and when the photovoltaic system is in the abovementioned second mode of operation the charging device 14 should be in the inactive mode.

As shown in FIG. 3, the charger device can include a DC/DC converter 14, or other suitable component as desired. The first input terminal 15 of the converter 14 can be connected to a second input terminal 18 of the voltage adding arrangement 4, and the second input terminal 18 can be connected to the first input terminal 5 of the voltage adding arrangement 4. The second input terminal 16 of the DC/DC converter 14 can be connected to a third input terminal 19 of the voltage adding arrangement 4, and the third input terminal 19 can be connected to the output terminal 3 of the photovoltaic source 1. It should be apparent that in this embodiment the first input terminal 15 of the DC/DC converter 14 can be connected directly to the first input terminal 5 of the voltage adding arrangement or to the input terminal 2 of the photovoltaic source 1, and the second input terminal 16 of the DC/DC converter 14 can be connected directly to the output terminal 3 of the photovoltaic source 1. When the DC/DC converter 14 is in the abovementioned charging mode, the output voltage from the photovoltaic source 1 can be used to charge the voltage source 9. The DC/DC converter 14 can be put in the charging mode when the capability of the voltage source 9 reaches a predetermined level and/or when there is a surplus of energy from the photovoltaic source 1 with regards to the specified output voltage of the photovoltaic system.

As shown in FIG. 4, the charger device can include a AC/DC converter or a DC/DC converter 14, the first input terminal 15 of which can be connected to the second input terminal 18 of the voltage adding arrangement 4. The second input terminal 16 of the AC/DC converter or the DC/DC converter 14 can be connected to the third input terminal 19 of the voltage adding arrangement 4. The second input terminal 18 and third input terminal 19 of the voltage adding arrangement 4 can be connected to an external power source 20, e.g. a grid, power mains, a motor, a generator, or other suitable power source as desired. If the external power source 20 is a AC power source the charging device 14 is a AC/DC converter 14, for example, and if the external power source 20 is a DC power source the charging device shall be a DC/DC converter 14, or other suitable component. When the AC/DC converter or the DC/DC converter 14 is in the abovementioned charging mode, the external power source 20 can be used to charge the voltage source 9. The AC/DC converter or the DC/DC converter 14 can be put in charging mode when the capability of the voltage source 9 reaches a predetermined level and/or when there is no voltage output from the voltage source 9. In an exemplary embodiment, the charging device 14 can be set in charging mode during the night, when a slower charging of the voltage source 9 is admitted and thus a smaller charging device 14 is specified.

Figure 5:
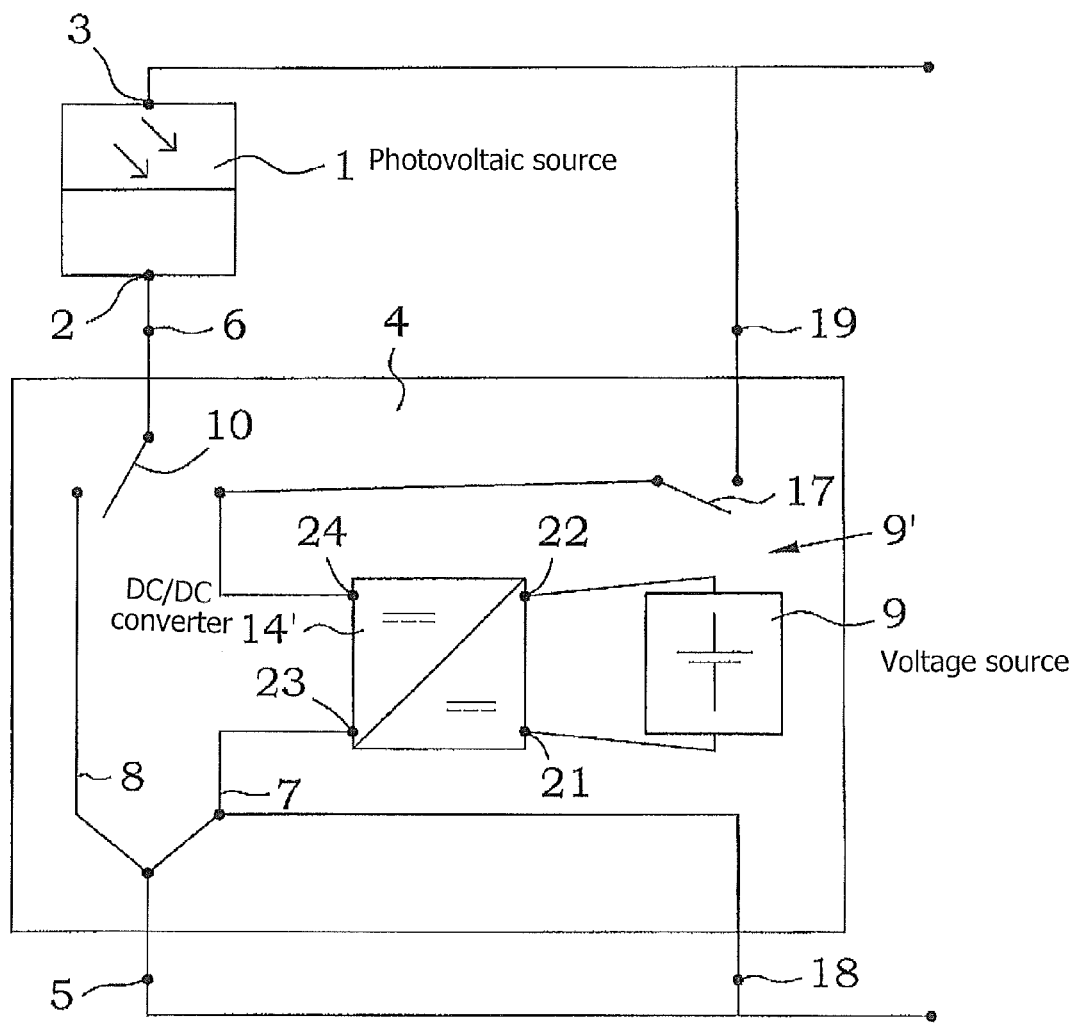
FIG. 5 is a schematic illustration of a fourth embodiment of the inventive photovoltaic system in accordance with an exemplary embodiment.

FIG. 5 is a schematic illustration of a fourth embodiment of the inventive photovoltaic system in accordance with an exemplary embodiment.

As shown in FIG. 5, the voltage adding arrangement 4 can include a regulated voltage source 9'. The regulated voltage source 9' includes a voltage source 9 and a charger device 14'. The charger device 14' can include a bidirectional DC/DC converter, or other suitable component as desired, and the voltage source 9 can be a fixed voltage source, e.g. a battery, or a regulated voltage source, as disclosed in connection with FIG. 2. The voltage source 9 can be connected to a first input terminal 21 and to a second input terminal 22 of the bidirectional DC/DC converter 14'. A first output terminal 23 of the bidirectional DC/DC converter 14' can be connected to the first input terminal 5 of the voltage adding arrangement 4, and a second output terminal 24 of the bidirectional DC/DC converter 14' can be connected to the first route 7, at the opposite side of the route switch 10 than the output terminal 6 of the voltage adding arrangement 4, and be connected by means of a charger switch 17 to the third input terminal 19 of the voltage adding arrangement 4. The third input terminal 19 can be connected to the output terminal 3 of the photovoltaic source 1. It should be apparent that in this embodiment, the first output terminal 23 of the bidirectional DC/DC converter 14' can be connected to the second input terminal 18 of the voltage adding arrangement 4, and the second output terminal 24 of the bidirectional DC/DC converter 14' can be connected by means of the charger switch 17 directly to the output terminal 3 of the photovoltaic source 1.

The bidirectional DC/DC converter 14' can have a regulator mode when the first route 7 of the voltage adding arrangement 4 is active and the charger switch 17 is open, and a charging mode when the second route 8 of the voltage adding arrangement 4 is active and the charger switch 17 is closed. When the bidirectional DC/DC converter 14' is in the regulator mode, the output voltage from the voltage source can be a value between 0% and 100% of the capacity of the voltage source 9, or higher than 100% if the regulator is of a suitable boost converter type. However, some structural losses can still occur. Thus, when the photovoltaic system is in the first mode of operation, the bidirectional DC/DC converter 14' can be in either the regulator mode or in the charging mode, and when the photovoltaic system is in the abovementioned second mode of operation, the bidirectional DC/DC converter 14' should be in the regulator mode. The bidirectional DC/DC converter 14' can be put in charging mode when the capacity of the voltage source 9 reaches a predetermined level and/or when there is a surplus of energy from the photovoltaic source 1 with regards to the required output voltage of the photovoltaic system.

In an exemplary embodiment, the bidirectional DC/DC converter 14' can be exchanged by a device capable of regulating the output voltage of the voltage source 9. The second output terminal 24 of that device should not be connected to the third input terminal 19 of the voltage adding arrangement 4. In addition, a separate charging device, e.g. as disclosed in connection with the second and third embodiments of FIGS. 3 and 4, respectively, could be used. That is, such an alternative should be constituted by said second or third embodiment of the present disclosure having a regulated voltage source with a continuously variable output voltage.

The disclosure is not limited only to the embodiments described above and shown in the drawings, which primarily have an illustrative and exemplifying purpose. This disclosure covers all adjustments and variants of the exemplary embodiments described herein, thus the present disclosure is defined by the wording of the appended claims and the equivalents thereof. Thus, the photovoltaic system may be modified in all kinds of ways within the scope of the appended claims.

In the context of the present disclosure, it should be apparent that the word or expression "voltage adding arrangement" is not delimited by a box as in the shown embodiments. Furthermore, all input and output terminals disclosed in this document do not need to be physical entities.

In the context of the present disclosure, it should be apparent that all switches can be controlled by a control system (not shown) which for instance may supervise the instantaneous capacity of the voltage source, the instantaneous output voltage from the photovoltaic source, the instantaneous irradiation, or other suitable control as desired.

In the context of the present disclosure, it should be apparent that the capacity of the voltage source can be a part of, equal to, or more than, the capacity of the photovoltaic source, all depending on the specific application. If the photovoltaic system is expected to have an output voltage during long cloudy periods or during the nights, the capacity of the voltage source should be equal to or more than the capacity of the photovoltaic source. If the voltage source is expected only to support the photovoltaic source during short periods of decreased irradiation, the capacity of the voltage source could for instance be about 10-40% of the capacity of the photovoltaic source.

For instance, it shall be apparent that in an exemplary embodiment if the photovoltaic source is located upstream of the voltage adding arrangement, instead of downstream like all shown embodiments, the charging devices according to the second and fourth embodiments of the present disclosure can be connected to the input terminal of the photovoltaic source and to the output terminal of the voltage adding arrangement.

In the context of the present disclosure, it should be apparent that all information about/concerning terms such as above, below, under, upper, first, second, third, etc., shall be interpreted/read having the equipment oriented according to the figures, having the drawings oriented such that the references can be properly read. Thus, such terms only indicates mutual relations in the shown embodiments, which relations may be changed if the inventive equipment is provided with another structure/design.

In the context of the present disclosure, it should be apparent that while not explicitly stated, features from a specific embodiment can be combined with features from another embodiment, the combination shall be considered obvious, if the combination is possible. For example, the charging arrangement according to the second embodiment of the present disclosure can be supplemented with the charging arrangement according to the third embodiment of the present disclosure, in order to admit charging by night if needed.

In the context of the present disclosure, it should be apparent that other photovoltaic sources and/or voltage adding arrangements can be connected to the exemplary photovoltaic system in parallel, in series, or in any combination thereof.

In addition, a common charger device can be used to charge several voltage sources.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A photovoltaic system for generating an output voltage that is uninfluenced by varying irradiation, the photovoltaic system comprising:
  an electrically rechargeable photovoltaic source having a first connector and a second connector;
  a voltage adding arrangement that includes a first connector, a second connector, a first route having a voltage source, and a second route as a voltage source bypass, wherein the first and second routes extend between said first connector and said second connector of the voltage adding arrangement;

wherein the voltage adding arrangement is connected in series with the photovoltaic source and said first and second routes are alternately activateable, wherein the voltage adding arrangement includes a charger device connected to the voltage source of the first route, the charger device having a first input terminal and a second input terminal, and is connected to a charger switch for using output voltage from the photovoltaic source to electrically charge the voltage source.

2. The photovoltaic system of claim 1, wherein the photovoltaic source includes a photovoltaic module or a plurality of photovoltaic modules.

3. The photovoltaic system of claim 1, wherein the voltage adding arrangement comprises a common route switch for the first route and the second route.

4. The photovoltaic system of claim 1, wherein the first route and the second route of the voltage adding arrangement comprises separate route switches.

5. The photovoltaic system of claim 1, wherein the voltage source is constituted by a fixed voltage source or a regulated voltage source.

6. The photovoltaic system of claim 1, wherein the voltage source comprises at least one battery.

7. The photovoltaic system of claim 1, wherein the voltage source comprises at least two batteries, which are individually connectable in series with the first route and with each other.

8. The photovoltaic system of claim 1, wherein the charger device has an inactive mode when the charger switch is open, and a charging mode when the second route of the voltage adding arrangement is active and the charger switch is closed.

9. The photovoltaic system of claim 1, wherein at least one of the first input terminal and the second input terminal of the charger device is connected to said charger switch.

10. The photovoltaic system of claim 1, wherein the charger device is a DC/DC converter, a first input terminal of which is connected, directly or indirectly, to an input terminal of the photovoltaic source, and a second input terminal of which is connected, directly or indirectly, to an output terminal of the photovoltaic source.

11. The photovoltaic system according to claim 1, wherein the charger device is a AC/DC converter or a DC/DC converter, wherein a first input terminal is connected to a third connector of the voltage adding arrangement and a second input terminal is connected to a fourth connector of the voltage adding arrangement, said third and fourth connectors of the voltage adding arrangement are connectable to an external power source.

12. The photovoltaic system according to claim 1, wherein the voltage adding arrangement comprises a regulated voltage source, which includes a voltage source and said charger device, wherein the charger device includes a bidirectional DC/DC converter, wherein the voltage source is connected to a first input terminal and a second input terminal of the bidirectional DC/DC converter, wherein a first output terminal of the bidirectional DC/DC converter is connected to the first input terminal of the voltage adding arrangement, and a second output terminal of the bidirectional DC/DC converter is connected to the first route at an opposite side of the route switch than an output terminal of the voltage adding arrangement and is connected by means of said charger switch, directly or indirectly, to an output terminal of the photovoltaic source.

13. The photovoltaic system according to claim 12, wherein the bidirectional DC/DC converter has a regulator mode when the first route of the voltage adding arrangement is active and the charger switch is open, and a charging mode when the second route of the voltage adding arrangement is active and the charger switch is closed.

* * * * *